United States Patent
Welsh (10) Patent No.: US 11,717,865 B2
(45) Date of Patent: Aug. 8, 2023

(54) METHOD OF CLEANING A NOZZLE OF A JET PUMP ASSEMBLY OF A NUCLEAR REACTOR

(71) Applicant: GE-Hitachi Nuclear Energy Americas LLC, Wilmington, NC (US)

(72) Inventor: Christopher Martin Welsh, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1719 days.

(21) Appl. No.: 15/696,537

(22) Filed: Sep. 6, 2017

(65) Prior Publication Data
US 2019/0070645 A1    Mar. 7, 2019

(51) Int. Cl.
| | |
|---|---|
| *B08B 9/032* | (2006.01) |
| *G21C 15/25* | (2006.01) |
| *G21C 17/017* | (2006.01) |
| *F04F 5/10* | (2006.01) |
| *B05B 15/62* | (2018.01) |

(52) U.S. Cl.
CPC .......... *B08B 9/0328* (2013.01); *B08B 9/0323* (2013.01); *G21C 15/25* (2013.01); *G21C 17/017* (2013.01); *B05B 15/62* (2018.02); *F04F 5/10* (2013.01)

(58) Field of Classification Search
None
See application file for complete search history.

(56) References Cited

U.S. PATENT DOCUMENTS

| | | | |
|---|---|---|---|
| 4,910,823 A * | 3/1990 | Silverman | G21C 19/00 134/102.1 |
| 5,361,286 A * | 11/1994 | Monserud | B08B 9/0433 376/316 |
| 5,418,824 A | 5/1995 | Monserud et al. | |
| 5,699,397 A | 12/1997 | Jensen | |
| 6,622,941 B2 | 9/2003 | Ganoza et al. | |
| 8,016,950 B2 | 9/2011 | Kim et al. | |
| 2003/0085301 A1 | 5/2003 | Ganoza et al. | |
| 2004/0131137 A1 | 7/2004 | Bernard | |
| 2004/0131462 A1 | 7/2004 | Hawkins et al. | |
| 2005/0103362 A1 | 5/2005 | Soyama | |

(Continued)

FOREIGN PATENT DOCUMENTS

| | | |
|---|---|---|
| JP | H07-055985 A | 3/1995 |
| JP | H08-5773 A | 1/1996 |

(Continued)

OTHER PUBLICATIONS

JP 2007178191 English Translation, accessed on Dec. 2019. (Year: 2007).*
Search Report for European Application No. 18191687.5 dated Jan. 24, 2019, 5 pages.

(Continued)

*Primary Examiner* — Eric W Golightly
*Assistant Examiner* — Arlyn I Rivera-Cordero
(74) *Attorney, Agent, or Firm* — Harness, Dickey & Pierce, P.L.C.

(57) ABSTRACT

A method of cleaning a jet pump assembly of a nuclear reactor may comprise evacuating an interior of the jet pump assembly that is filled with a first liquid by injecting a gas to purge the first liquid from the interior to provide an evacuated surface. In addition, the method may comprise directing a jet of a second liquid onto the evacuated surface.

13 Claims, 6 Drawing Sheets

(56) References Cited

U.S. PATENT DOCUMENTS

| | | | |
|---|---|---|---|
| 2005/0199271 A1* | 9/2005 | Watt | B08B 3/02 |
| | | | 134/28 |
| 2008/0264451 A1 | 10/2008 | Shimamura et al. | |
| 2009/0223537 A1 | 9/2009 | Baron et al. | |
| 2010/0150299 A1 | 6/2010 | Ito et al. | |
| 2011/0194663 A1 | 8/2011 | Hori et al. | |

FOREIGN PATENT DOCUMENTS

| | | |
|---|---|---|
| JP | 2000-035495 A | 2/2000 |
| JP | 2000-056070 A | 2/2000 |
| JP | 2000-235495 A | 8/2000 |
| JP | 2001-064929 A | 3/2001 |
| JP | 2003-270379 A | 9/2003 |
| JP | 2006-292628 A | 10/2006 |
| JP | 2007-171193 A | 7/2007 |
| JP | 2007-178191 A | 7/2007 |
| TW | 225032 B | 6/1994 |
| TW | 373183 B | 11/1999 |
| TW | 529034 B | 4/2003 |
| TW | I462118 B | 11/2014 |

OTHER PUBLICATIONS

Search Report for corresponding European Application No. 18191689.1 dated Feb. 11, 2019, 7 pages.
Office Action dated Jun. 4, 2019, issued in corresponding U.S. Appl. No. 15/696,595, 9 pages.
Office Action dated Sep. 12, 2019, issued in corresponding U.S. Appl. No. 15/696,595, 9 pages.
U.S. Notice of Allowance dated Apr. 20, 2020 for corresponding U.S. Appl. No. 15/696,595, 8 pages.
Search Report for European Application No. 20157240.1 dated Jun. 8, 2020, 54 pages.
Office Action dated Jun. 28, 2022 issued in corresponding Japanese Patent Application No. 2018-159961, 8 Pages.
Office Action for Mexican Application No. MX/a/2018/010705 dated Feb. 11, 2022, 5 Pages.
Notice of Allowance for U.S. Appl. No. 16/914,878 dated Apr. 22, 2022, 5 Pages.
Office Action for Taiwanese Application No. 107129433 dated Jul. 7, 2021 and English translation, 8 Pages.
Office Action for Taiwanese Application No. 107129758 dated Mar. 1, 2022, 3 Pages.

* cited by examiner

FIG. 1

CONVENTIONAL ART

METHOD OF CLEANING A NOZZLE OF A JET PUMP ASSEMBLY OF A NUCLEAR REACTOR

BACKGROUND

Field

The present disclosure relates to methods of cleaning a jet pump assembly of a nuclear reactor.

Description of Related Art

Figure 1:
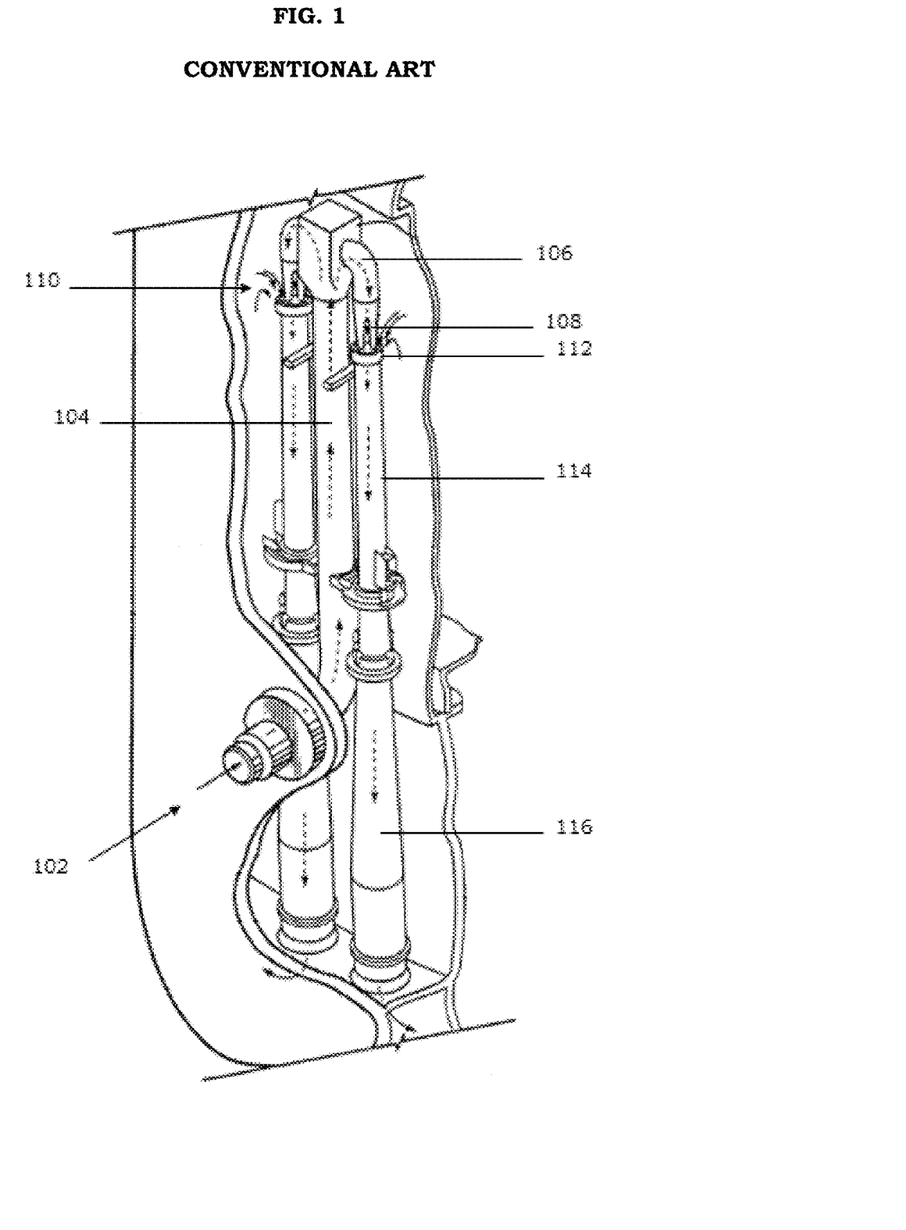
FIG. 1 is a cutaway view of a conventional jet pump assembly in a reactor pressure vessel of a boiling water reactor (BWR).

FIG. 1 is a cutaway view of a conventional jet pump assembly in a reactor pressure vessel of a boiling water reactor (BWR). Referring to FIG. 1, a drive flow 102 of a motive fluid (liquid coolant outside the reactor pressure vessel) enters the inlet riser pipe 104 and flows upwardly to the inlet elbows 106. As the drive flow 102 is discharged downwards through the nozzles 108, an entrained flow 110 of suction fluid (liquid coolant inside the reactor pressure vessel) is drawn into the throat section 112 of the inlet mixer 114 and is mixed with the drive flow 102. The mixed flow continues downwardly to the diffusers 116 where the kinetic energy of the mixed flow is converted to pressure.

When the boiling water reactor is shut down for maintenance, the jet pump assembly still contains the liquid of the drive flow 102 and the entrained flow 110. As a result, the cleaning of the jet pump assembly typically involves disassembling it in order to permit adequate access to the desired surfaces for cleaning. While efforts have been made to clean the jet pump assembly without disassembling it, the ability to adequately clean the jet pump assembly remains a challenge in such a situation.

SUMMARY

A method of cleaning a jet pump assembly of a nuclear reactor may comprise evacuating an interior of the jet pump assembly that is filled with a first liquid by injecting a gas to purge the first liquid from the interior to provide an evacuated surface. In addition, the method may comprise directing a jet of a second liquid onto the evacuated surface.

The evacuating of the interior of the jet pump assembly may include injecting the gas to expose an inner surface of a nozzle of the jet pump assembly.

The evacuating of the interior of the jet pump assembly may include injecting air as the gas to purge the first liquid. The first liquid may be water.

The evacuating of the interior of the jet pump assembly may include driving a level of the first liquid down to a distal end of a nozzle of the jet pump assembly.

The evacuating of the interior of the jet pump assembly may include simultaneously purging the first liquid from all nozzles of the jet pump assembly.

The jet pump assembly may include an inlet riser pipe and two inlet mixers. The evacuating of the interior of the jet pump assembly may include driving the first liquid down to a same level in the inlet riser pipe and the two inlet mixers.

The evacuating of the interior of the jet pump assembly may include driving a level of the first liquid down to a throat section of each of the two inlet mixers.

The injecting of the gas may be performed at a pressure ranging from about 10 to 35 pounds per square inch.

The injecting of the gas may be performed such that the gas occupies at least 95% of a volume defined by a nozzle of the jet pump assembly.

The directing of the jet of the second liquid may be performed at a pressure of at least 20,000 pounds per square inch.

The directing of the jet of the second liquid may include forcing water as the second liquid onto the evacuated surface to remove deposits of oxides therefrom.

The forcing of the water may be performed such that at least 80% of the deposits of oxides are removed from the evacuated surface.

The evacuating of the interior of the jet pump assembly may include inserting a purging tool into a first nozzle of the jet pump assembly to inject the gas. The directing of the jet of the second liquid may include inserting a cleaning tool into a second nozzle of the jet pump assembly to supply the jet of the second liquid.

BRIEF DESCRIPTION OF THE DRAWINGS

The various features and advantages of the non-limiting embodiments herein may become e apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
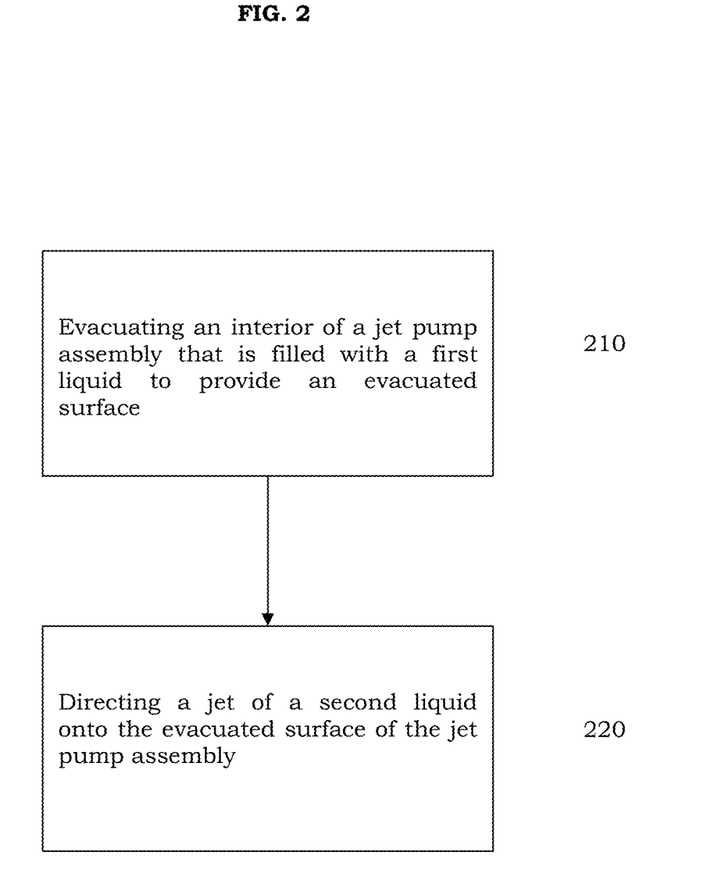
FIG. 2 is a flow chart of a method of cleaning a jet pump assembly of a nuclear reactor according to an example embodiment.

FIG. 2 is a flow chart of a method of cleaning a jet pump assembly of a nuclear reactor according to an example embodiment. Referring to FIG. 2, the method of cleaning a jet pump assembly of a nuclear reactor includes an evacuating step 210 and a directing step 220. Additionally, a disassembly of the jet pump assembly is not needed prior to the cleaning, thereby conserving time and costs.

The evacuating step 210 includes evacuating an interior of a jet pump assembly of a nuclear reactor to provide an evacuated surface. The interior of the jet pump assembly may be filled with a first liquid prior to the performance of the evacuating step 210. The directing step 220 includes directing a jet of a second liquid onto the evacuated surface of the jet pump assembly of the nuclear reactor. The first liquid may be the same substance as (or a different substance from) the second liquid.

Figure 3:
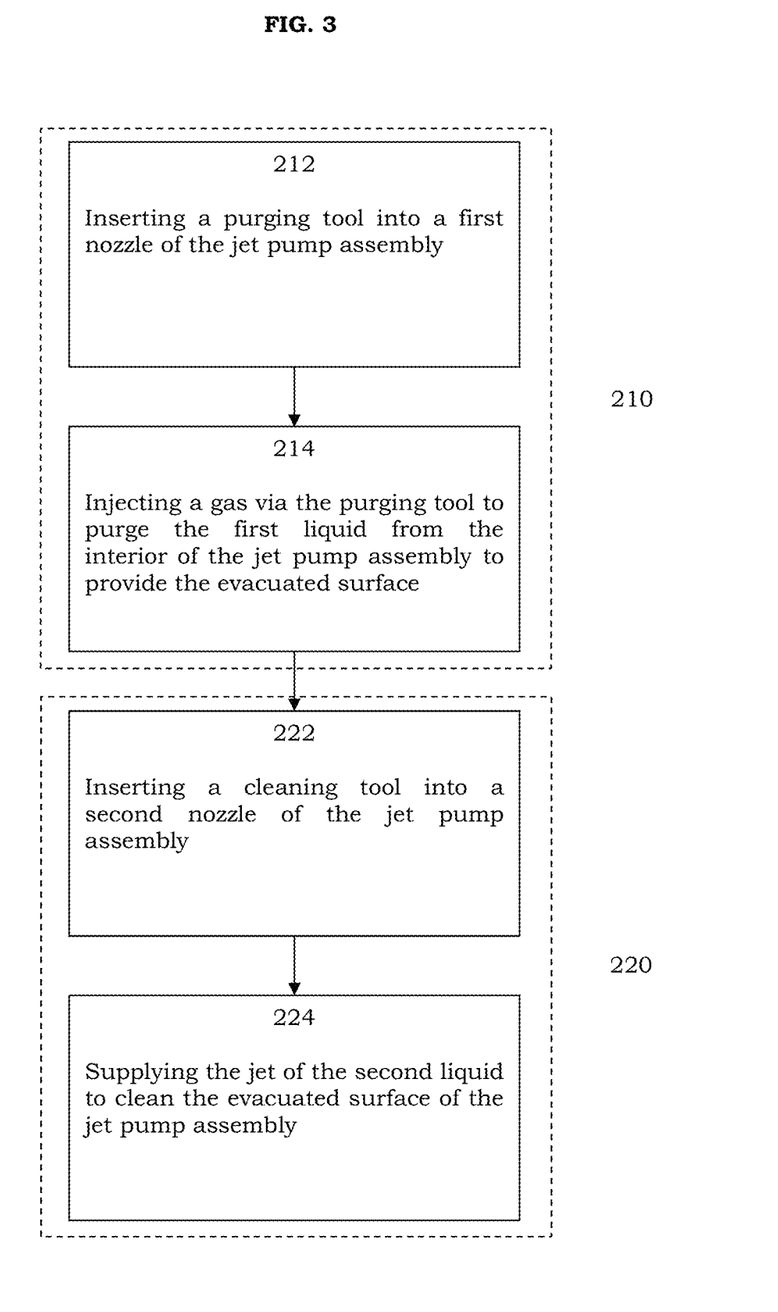
FIG. 3 is another flow chart of a method of cleaning a jet pump assembly of a nuclear reactor according to an example embodiment.

FIG. 3 is another flow chart of a method of cleaning a jet pump assembly of a nuclear reactor according to an example embodiment. Referring to FIG. 3, the evacuating step 210 may include an inserting sub-step 212 and an injecting sub-step 214. The inserting sub-step 212 includes inserting a purging tool into a first nozzle of the jet pump assembly. The injecting sub-step 214 includes injecting a gas via the purging tool to purge the first liquid from the interior of the jet pump assembly to provide the evacuated surface.

The directing step 220 may include an inserting sub-step 222 and a supplying sub-step 224. The inserting sub-step 222 includes inserting a cleaning tool into a second nozzle of the jet pump assembly. The supplying sub-step 224 includes supplying the jet of the second liquid to clean the evacuated surface of the jet pump assembly.

According to an example embodiment, a method of cleaning a jet pump assembly of a nuclear reactor may include evacuating an interior of the jet pump assembly that is filled with a first liquid by injecting a gas to purge the first liquid from the interior to provide an evacuated surface. The evacuating may include injecting the gas to expose at least an inner surface of a nozzle of the jet pump assembly. The injecting may be performed such that the gas occupies at least 95% of a volume defined by the nozzle of the jet pump assembly. For instance, the evacuating may include injecting air as the gas to purge the first liquid. The injecting may be performed at a pressure ranging from about 10 to 35 pounds per square inch. The first liquid may be water.

In addition, the method of cleaning may include directing a jet of a second liquid onto the evacuated surface within the jet pump assembly. The directing may be performed at a pressure of at least 20,000 pounds per square inch. For instance, the directing may include forcing water as the second liquid onto the evacuated surface to remove deposits of oxides therefrom. The forcing of the water may be performed such that at least 80% of the deposits of oxides are removed from the evacuated surface.

Figure 4:
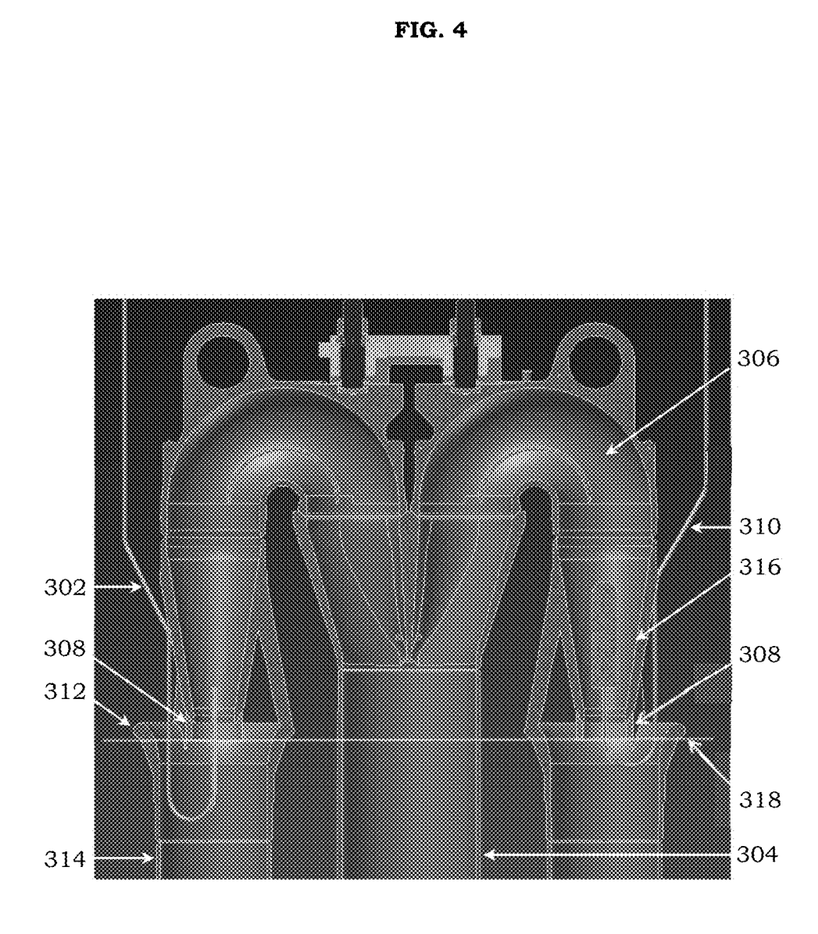
FIG. 4 is a cross-sectional view of a jet pump assembly during a method of cleaning according to an example embodiment.

FIG. 4 is a cross-sectional view of a jet pump assembly during a method of cleaning according to an example embodiment. Referring to FIG. 4, the jet pump assembly includes an inlet riser pipe 304 that is connected to a bifurcated structure that includes a pair of inlet elbows 306. Each inlet elbow 306 transitions into a nozzle 308 that extends into a throat section 312 of an inlet mixer 314. Although only one nozzle 308 is shown in FIG. 4 in connection with each inlet elbow 306, it should be understood that other configurations are possible. For instance, the jet pump assembly may be configured such that a plurality of nozzles (e.g., five nozzles) may be provided in connection with each inlet elbow 306.

When the nuclear reactor is in operation, a first fluid flows upward through the inlet riser pipe 304, splits toward each of the inlet elbows 306, and exits through the nozzles 308. As a result, the interior of the jet pump assembly (that is defined at least by the inlet riser pipe 304, the inlet elbows 306, and the nozzles 308) will be filled with the first liquid during the operation of the nuclear reactor. In addition, the first liquid will still be present in the jet pump assembly when the nuclear reactor is shut down for maintenance.

During a method of cleaning the jet pump assembly, the initial evacuating step includes inserting a purging tool 302 into a first nozzle (e.g., nozzle 308 on the left in FIG. 4) of the jet pump assembly to inject a gas for purging. In addition, the subsequent directing step includes inserting a cleaning tool 310 into a second nozzle (e.g., nozzle 308 on the right in FIG. 4) of the jet pump assembly to supply the jet of the second liquid for cleaning. Conversely, the first nozzle can be cleaned by switching the positions of the purging tool 302 and the cleaning tool 310.

It should be understood that the first nozzle and the second nozzle do not need to be on different inlet elbows 306. For instance, when the jet pump assembly is configured to include a plurality of nozzles in connection with each inlet elbow 306, the first nozzle and the second nozzle may be on the same inlet elbow 306 or on different inlet elbows 306. In addition, after the second nozzle is cleaned, the cleaning tool 310 may be moved to clean another nozzle while keeping the purging tool 302 in the first nozzle to maintain the evacuated surfaces within the jet pump assembly. Furthermore, while it may be beneficial for the purging tool 302 and the cleaning tool 310 to be inserted into different nozzles for the purging and the cleaning so as to avoid the potential for interference, it should be understood that example embodiments are not limited thereto.

The purging tool 302 may include a bent wand with an injection head secured to the distal end of the bent wand. The purging tool 302 may be manipulated via the bent wand. In an example embodiment, the bent wand may include a first angled section, a second angled section, and a U-shaped section. A plant operator can handle the purging tool 302 via the proximal end of the bent wand so as to lower the U-shaped section into the throat section 312 and introduce the injection head into the first nozzle (e.g., nozzle 308 on the left in FIG. 4) from below.

Similarly, the cleaning tool 310 may include a bent wand with a spray head secured to the distal end of the bent wand. Like the purging tool 302, the cleaning tool 310 may be manipulated via the bent wand. In an example embodiment, the bent wand may include a first angled section, a second angled section, and a U-shaped section. A plant operator can handle the cleaning tool 310 via the proximal end of the bent wand so as to lower the U-shaped section into the throat section 312 and introduce the spray head into the second nozzle (e.g., nozzle 308 on the right in FIG. 4) from below.

When evacuating the interior of the jet pump assembly, the purging tool 302 is used to inject a gas to drive the first liquid within down to a level 318 that coincides with at least a distal end of a nozzle 308 of the jet pump assembly. In addition, when the nozzles 308 have horizontally-aligned distal ends, the gas can be injected by the purging tool 302 to simultaneously purge the first liquid from all of the nozzles 308 of the jet pump assembly. Furthermore, when the jet pump assembly includes the inlet riser pipe 304 and two inlet mixers 314, the evacuating may include driving the first liquid down to a level 318 that is the same in the inlet riser pipe 304 and the two inlet mixers 314. For instance, the evacuating may include driving the level 318 of the first liquid down to the throat section 312 of each of the two inlet mixers 314.

As a result of the purging of the first liquid from the jet pump assembly, the inner surface 316 of each of the nozzles 308 will be exposed. The cleaning tool 310 can then be used to direct a jet of a second liquid onto the inner surface 316 to clean the jet pump assembly.

As noted supra, the evacuating step and the directing step may be performed without disassembling the jet pump assembly. Because the method of cleaning can be performed without disassembling the jet pump assembly, the down time can be reduced, and the nuclear reactor can be returned to normal operation more quickly.

Figure 5:
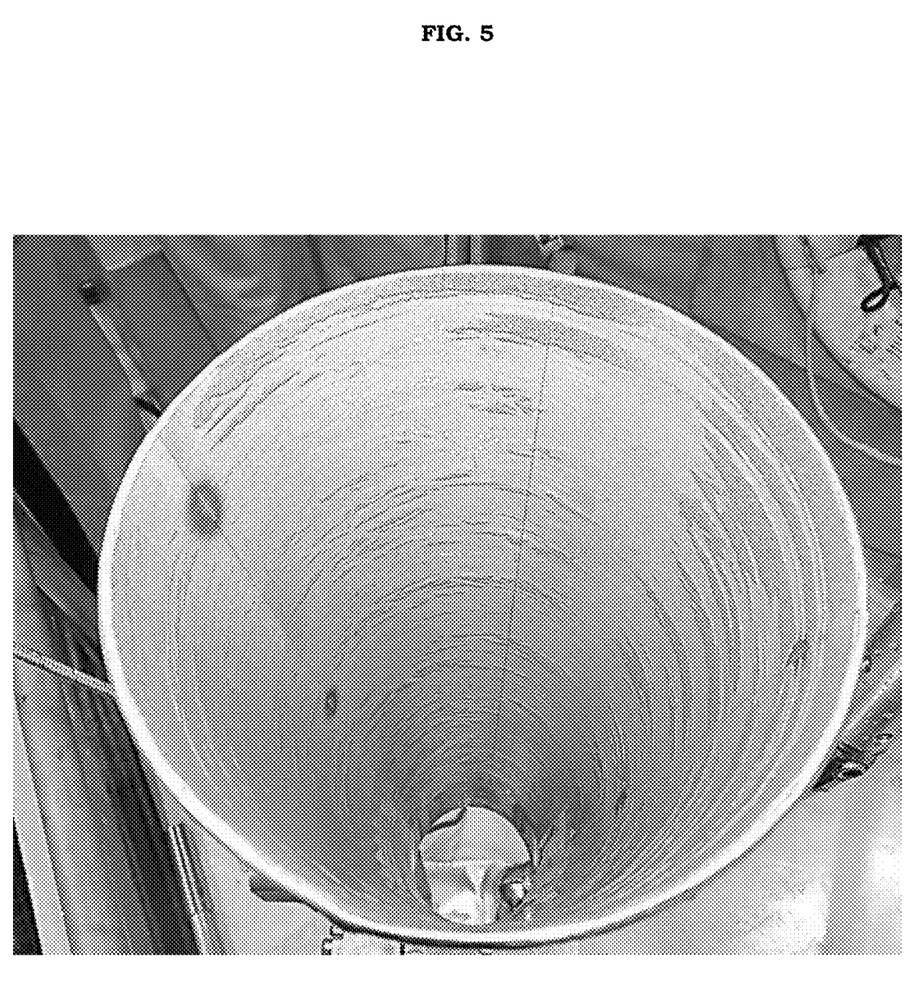
FIG. 5 is a photograph of a mockup of a nozzle of a jet pump assembly after a conventional method of cleaning.

FIG. 5 is a photograph of a mockup of a nozzle of a jet pump assembly after a conventional method of cleaning. Referring to FIG. 5, a significant amount of simulated deposits still remains on the mockup of the nozzle after the conventional method of cleaning.

Figure 6:
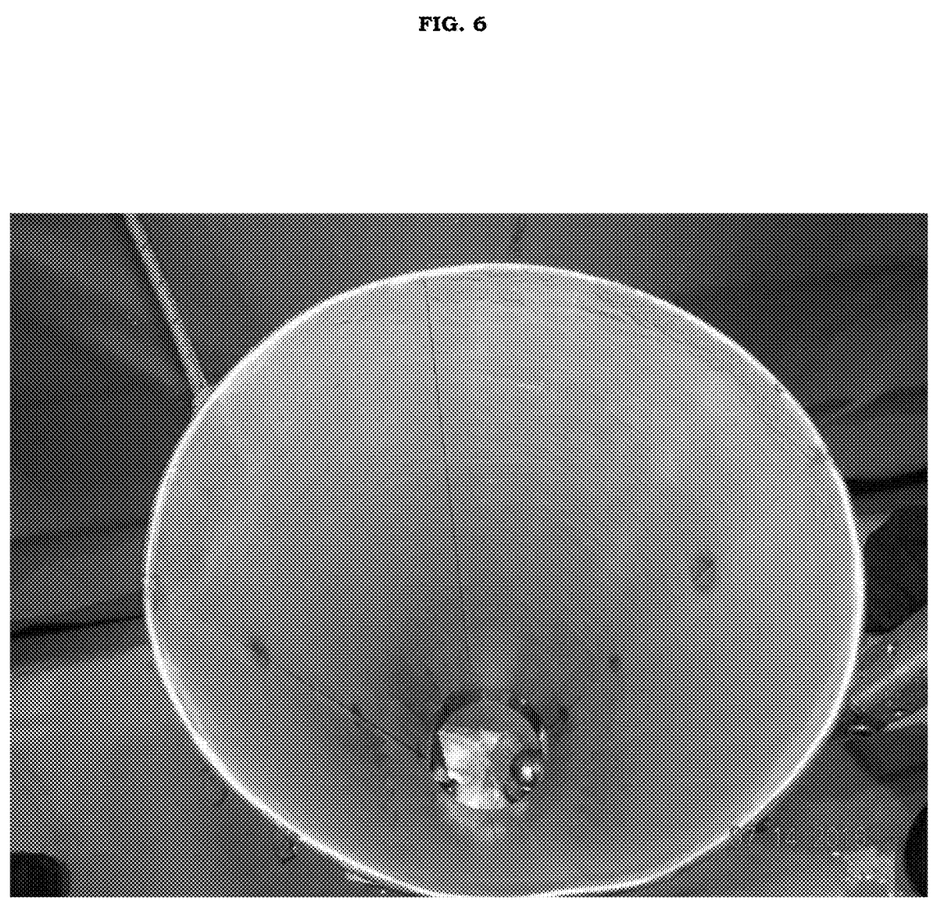
FIG. 6 is a photograph of a mockup of a nozzle of a jet pump assembly after a method of cleaning according to an example embodiment.

FIG. 6 is a photograph of a mockup of a nozzle of a jet pump assembly after a method of cleaning according to an example embodiment. Referring to FIG. 6, the removal of the simulated deposits from the mockup of the nozzle is substantially improved (compared to FIG. 5) after a method of cleaning according to an example embodiment.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of cleaning a jet pump assembly of a nuclear reactor, comprising:
   evacuating an interior of the jet pump assembly that is filled with a first liquid by injecting a gas to purge the first liquid from the interior to provide an evacuated surface; and
   directing a jet of a second liquid onto the evacuated surface while continuing injecting the gas onto the evacuated surface.

2. The method of claim 1, wherein the evacuating includes injecting the gas to expose an inner surface of a nozzle of the jet pump assembly.

3. The method of claim 1, wherein the evacuating includes injecting air as the gas to purge the first liquid, the first liquid being water.

4. The method of claim 1, wherein the evacuating includes driving a level of the first liquid down to a distal end of a nozzle of the jet pump assembly.

5. The method of claim 1, wherein the evacuating includes simultaneously purging the first liquid from all nozzles of the jet pump assembly.

6. The method of claim 1, wherein the injecting is performed at a pressure ranging from about 10 to 35 pounds per square inch.

7. The method of claim 1, wherein the injecting is performed such that the gas occupies at least 95% of a volume defined by a nozzle of the jet pump assembly.

8. The method of claim 1, wherein the directing is performed at a pressure of at least 20,000 pounds per square inch.

9. The method of claim 1, wherein the evacuating includes inserting a purging tool into a first nozzle of the jet pump assembly to inject the gas, and the directing includes inserting a cleaning tool into a second nozzle of the jet pump assembly to supply the jet of the second liquid.

10. The method of claim 1, wherein the jet pump assembly includes an inlet riser pipe and two inlet mixers, and the evacuating includes driving the first liquid down to a same level in the inlet riser pipe and the two inlet mixers.

11. The method of claim 10, wherein the evacuating includes driving a level of the first liquid down to a throat section of each of the two inlet mixers.

12. The method of claim 1, wherein the directing includes forcing water as the second liquid onto the evacuated surface to remove deposits of oxides therefrom.

13. The method of claim 12, wherein the forcing of the water is performed such that at least 80% of the deposits of oxides are removed from the evacuated surface.

* * * * *